Patented Sept. 17, 1929

1,728,745

UNITED STATES PATENT OFFICE

WALTER JOHN BROWN, OF STOCKPORT, EDWARD JOHN EGERTON HUBBARD, OF HORSHAM, ERNEST YEOMAN ROBINSON, OF MANCHESTER, AND CECIL REGINALD BURCH, OF STRATFORD, ENGLAND, ASSIGNORS, BY MESNE ASSIGNMENTS, TO WESTINGHOUSE ELECTRIC & MANUFACTURING COMPANY, A CORPORATION OF PENNSYLVANIA

ELECTRIC RELAY APPARATUS EMPLOYING THERMIONIC VALVES

Application filed November 8, 1924, Serial No. 748,673, and in Great Britain November 12, 1923.

Our invention relates to relay protective apparatus and more particularly to improvements in time-limit relays, trip coils and the like, by the utilization of thermionic valves.

It is known that a time lag of the current behind the voltage occurs in certain electric circuits which include inductance, capacity and resistance, but the amount of energy that is associated with a charged condenser is relatively small and is insufficient, for example, for the operation of an ordinary relay if the condenser is to be of practicable dimensions. Consequently this method of imparting what are commonly known as time-limit characteristics to a relay and the like is not directly applicable.

The object of the present invention is to produce a time lag of the current in a circuit carrying a relatively large current suitable for the operation of relays and trip coils of circuit-interrupters.

According to the present invention, a circuit in which a desired time lag of the current is produced by the use of inductances, condensers and resistors is associated through the medium of one or more thermionic devices with a circuit carrying a direct or rectified alternating current suitable for the operation of relays and the like in such a manner that the time lag in the first circuit is reproduced in the mean current of the relay operating circuit which is thereby given the desired time-limit characteristics.

The invention therefore comprises arrangements of condensers, inductances and resistors, and in certain cases, a rectifier, which will give desired time lag, acting in conjunction with one or more thermionic valves with amplification, if necessary, by means of which relatively large currents can be produced.

In order that the invention may be fully understood, it will be described with reference to the accompanying drawings, in which Figs. 1 to 4 are diagrammatic views of four circuit arrangements in accordance with the invention.

Figure 1:
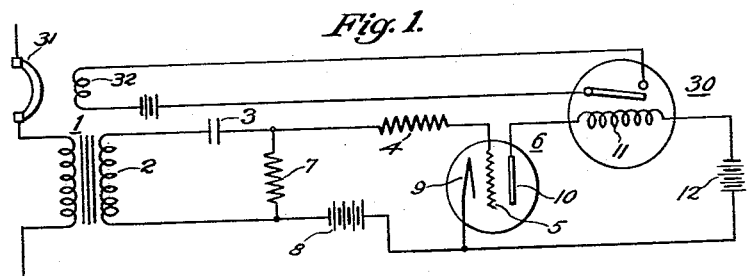

Referring to Fig. 1, a current transformer 1 is provided which gives an alternating voltage proportional to the line current in conjunction with which the time-limit relay acts. The secondary winding 2 of the transformer 1 is connected through a condenser 3 and a resistor 4 to the grid 5 of a three-electrode thermionic valve 6. A high resistance grid leak 7 and a grid biassing battery 8 are provided, the leak 7 being connected in parallel with the secondary winding 2 of the current transformer and the condenser 3, and the biassing battery 8 being connected between the junction of the grid leak 7 and secondary winding 2, and the cathode 9 of the valve 6. The valve 6 has an anode 10 that is connected through the operating coil 11 of a relay 30 to the positive terminal of a voltage source 12, the negative terminal of which is connected to the cathode 9 in the usual way. The relay 30 controls a circuit-interrupter 31 by means of the usual trip coil 32.

In this arrangement the secondary current of the transformer 1 is rectified and amplified by the valve 6. The condenser 3 normally has a mean charge depending on the constants of the circuit, which charge determines the mean grid voltage. When a change in the alternating line current occurs, a similar change in the alternating component of the grid voltage is instantaneously produced and hence the mean grid current changes instantaneously. The condenser 3 becomes gradually charged to a new mean value by the change in voltage produced by the changed mean current flowing through the grid leak 7. The time taken for the condenser charge to reach its new value depends on the dimensions of the condenser 3, the resistor 4, the grid leak 7 and the grid current-grid voltage characteristic of the valve, which may be altered by the battery 8. When the new state of equilibrium is reached, the grid voltage has a new mean value, and consequently the mean anode current is changed. The relay 30 having the operating coil 11 may be adjusted to operate at a value of the anode current corresponding, after the desired time lag, to any predetermined line current. The arrangement can obviously be applied to direct-current circuits, it being merely necessary to arrange that the condenser 3 is charged in accordance with changes in the value of the direct current.

Figure 2:
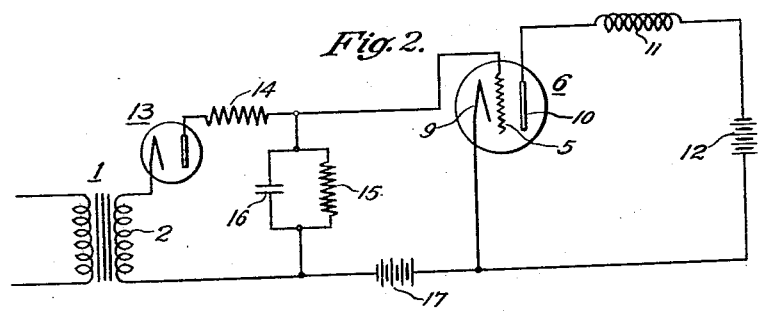

Referring to Fig. 2, a voltage proportional to the line current is obtained as before from the current transformer 1. The secondary winding 2 is connected to one terminal of the rectifier 13 such as a diode thermionic device. The other terminal of the rectifier is connected through a resistor 14 to a circuit comprising a resistor 15 in parallel with a condenser 16. This circuit is completed from the secondary winding 2 as shown. The terminals of the condenser 16 are connected respectively to the grid 5 of the thermionic valve 6 and through a grid biassing battery 17 to the cathode 9 of the valve. The anode 10 is connected as before through the operating winding 11 of a relay or trip coil to the source 12 of anode voltage.

When an increase in line current occurs the increased output current from the rectifier 13 charges the condenser 16 through the resistance 14 to a new mean value. The time of charging, depending on the resistances 14 and 15 and the condenser 16, can be made of any desired length. As the charge on the condenser 16 alters, the grid voltage falls. Consequently the corresponding anode current through the valve 6 falls and the relay may be adjusted to operate when this current has fallen to a predetermined value, that is to say, when the line current has risen to a predetermined value and remained there for a predetermined time. In the case of direct-current supply, the diode rectifier 13 is obviously unnecessary.

Figure 3:
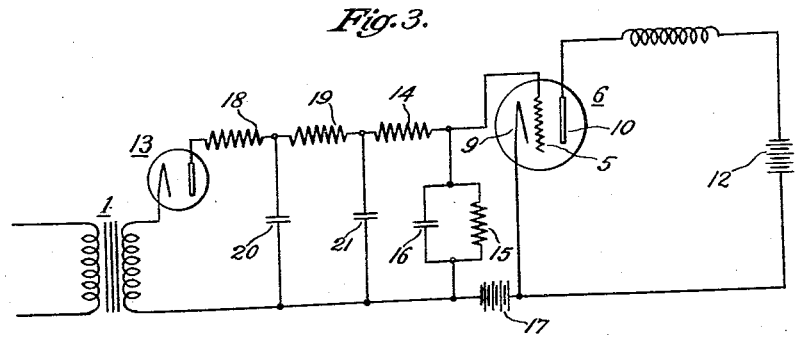

In Fig. 3 a modified arrangement is shown in which a chain of resistors 18 and 19 in series and condensers 20 and 21 in shunt are inserted between the output terminal of the rectifier 13 and the circuit comprising the resistor 14 and the condenser 16 in parallel with the resistor 15. In this arrangement a further delay of the fall of grid voltage of the valve 6 is obtained and also a more suitable time-grid voltage curve or characteristic.

Figure 4:
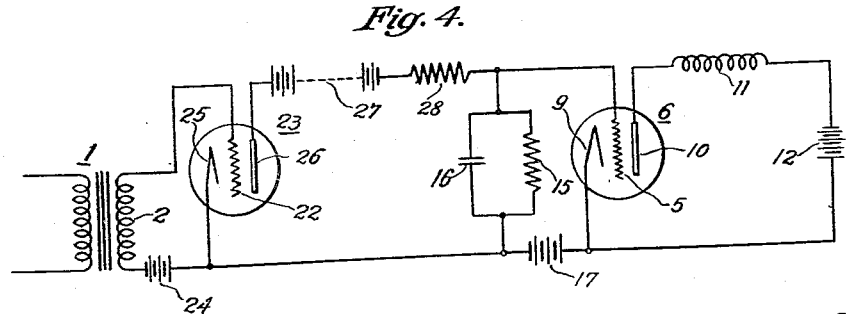

Referring to Fig. 4, which illustrates a modified arrangement, a voltage proportional to the line current is obtained by means of the current transformer 1. The terminals of the secondary winding 2 of the transformer are connected respectively to the grid 22 of a three-electrode valve 23 and through a biassing battery 24 to the cathode 25 of the valve. The anode 26 is connected through an anode battery 27 to a resistor 28 and the circuit comprising the resistor 15 in parallel with the condenser 16. The terminals of the resistor 15 are connected respectively to the grid 5 of the valve 6 and to the cathode 9 of the valve through a grid biassing battery 17. The anode 10 of the valve 6 is connected as in the previous arrangements through the operating coil 11 of a relay to the source of voltage 12.

In this arrangement until the line current exceeds a predetermined value depending on the constants of the valve 23 and the respective voltages of the anode battery 27 and the grid biassing battery 24 the anode current through the valve 23 is substantially zero. For values of the line current slightly in excess of this predetermined value the critical mean grid voltage is reached and the mean anode current can become large. By means of the resistors 28 and 15, the change in the mean grid voltage of the three-electrode valve 6 can be delayed to any desired extent. This lag is imposed on a corresponding relay-operating anode current through the valve. The arrangement therefore provides the desired time lag feature and in addition, sensitiveness to small changes in the value of the alternating line current can be obtained.

It is to be understood that the invention is not limited to the particular arrangements described, but that various modifications may be made without departing from the scope of the invention.

We claim as our invention:—

1. In an electrical system, a conductor adapted to carry a power current, a circuit-interrupter therein, a thermionic valve comprising a cathode, anode and grid for controlling said circuit-interrupter, connections between said conductor and the grid and means including a condenser and grid leak resistor for controlling the anode current of said valve in accordance with the current flowing in said conductor.

2. In an electrical system, a conductor adapted to carry a power current, a circuit-interrupter therein, a thermionic valve comprising a cathode, anode and grid for controlling said circuit-interrupter, connections between said conductor and the grid and means including a condenser and grid leak resistor connected to said grid for controlling the anode current of said valve.

3. In combination, a circuit-interrupter adapted to control a power current, a triode valve controlling said interrupter, and means for controlling the time-rate of exchange of the current flowing through said valve comprising a condenser and grid leak resistor connected to the grid, said condenser being charged by the grid current through said valve.

4. In combination, a conductor adapted to carry a power current, a thermionic valve comprising a cathode, anode and grid, connections between said conductor and the grid, and means including a condenser and grid-leak resistor for controlling the anode current of said valve in accordance with the current flowing in said conductor but with a time delay with reference to changes in such current.

5. The combination with a main alternating-current circuit to be protected, of a circuit-interrupter therefor, a circuit receiving energy from said main circuit and containing a resistance and a condenser, whereby the condenser is charged to a mean value in accordance with the magnitude of the current traversing said main circuit, another circuit including said condenser and a second resistance of relatively high value for controlling the rate of change of condenser charge, and means, including a three-electrode valve relay and another relay, for controlling said circuit interrupter.

6. The combination with a circuit to be protected, of a circuit-interrupter therein, a primary of a current transformer therein, means, including the current transformer, responsive to the variations in magnitude of the circuit current and permanently connected thereto for charging a condenser to mean values of charge in accordance with said variations, and means, including a three-electrode valve, responsive to variations in the mean condenser charge for controlling the interrupter with time delay.

7. The combination with a circuit to be protected, of a circuit-interrupter therein, means responsive to the variations in magnitude of circuit current for charging a condenser to mean values according to said variations, and means responsive to variations in the mean condenser charge for controlling the interrupter with time delay.

8. The combination with a power line to be protected, of a circuit-interrupter therein, a thermionic valve having an anode and a grid for controlling said circuit-interrupter, connections between said line and the grid, and means, including a condenser and grid leak resistor, connected to said grid and responsive continuously to a current which varies as the line current for controlling the anode current of said valve.

In testimony whereof, we have hereunto subscribed our names this seventh day of October 1924.

WALTER JOHN BROWN.
EDWARD JOHN EGERTON HUBBARD.
ERNEST YEOMAN ROBINSON.
CECIL REGINALD BURCH.